(12) United States Patent
Tseng et al.

(10) Patent No.: US 11,467,369 B2
(45) Date of Patent: Oct. 11, 2022

(54) LENS ASSEMBLY MODULE WITH AUTOFOCUS FUNCTION AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Ming-Ta Chou, Taichung (TW); Hao-Jan Chen, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 43 days.

(21) Appl. No.: 17/009,140

(22) Filed: Sep. 1, 2020

(65) Prior Publication Data

US 2021/0088747 A1 Mar. 25, 2021

Related U.S. Application Data

(60) Provisional application No. 62/902,424, filed on Sep. 19, 2019.

(51) Int. Cl.
*H04N 5/225* (2006.01)
*G02B 7/09* (2021.01)
(Continued)

(52) U.S. Cl.
CPC ............... *G02B 7/09* (2013.01); *G02B 7/026* (2013.01); *G02B 13/001* (2013.01); *G03B 13/36* (2013.01);
(Continued)

(58) Field of Classification Search
CPC ........ G02B 7/09; G02B 7/026; G02B 13/001; G02B 7/08; G03B 13/36;
(Continued)

(56) References Cited

U.S. PATENT DOCUMENTS

| 7,589,922 B2 | 9/2009 | Higuchi |
| 7,706,088 B2 | 4/2010 | Chung |

(Continued)

FOREIGN PATENT DOCUMENTS

| CN | 106855652 A | 6/2017 |
| CN | 107238910 A | 10/2017 |

(Continued)

*Primary Examiner* — Padma Haliyur
(74) *Attorney, Agent, or Firm* — McClure, Qualey & Rodack, LLP

(57) ABSTRACT

A lens assembly module includes a base, a cover, a lens unit, an elastic element, at least two conductive elements, at least one AF coil element and at least two first magnetic elements. The cover is coupled to the base. The lens unit is movably disposed in the cover. The elastic element is coupled to the lens unit. The conductive elements are coupled to the lens unit. The AF coil element is disposed on the lens unit, and two ends of the AF coil element are electrically connected to the conductive elements, respectively. The first magnetic elements are disposed in the cover. A part of each of the extending structures is overlapped along a direction parallel to an optical axis and electrically connected to each conductive element. The AF coil element and the conductive elements are electrically connected by a welding method.

15 Claims, 13 Drawing Sheets

(51) Int. Cl.
*G02B 13/00* (2006.01)
*G02B 7/02* (2021.01)
*G03B 13/36* (2021.01)

(52) U.S. Cl.
CPC ... *H04N 5/2253* (2013.01); *G03B 2205/0053* (2013.01)

(58) Field of Classification Search
CPC .... G03B 2205/0053; G03B 2205/0069; G03B 2217/002; G03B 3/10; G03B 30/00; H04N 5/2253; H04N 5/2254
See application file for complete search history.

(56) References Cited

U.S. PATENT DOCUMENTS

| | | | |
|---|---|---|---|
| 7,808,730 B2 | 10/2010 | Yoon | |
| 7,864,461 B2 | 1/2011 | Yoshioka et al. | |
| 7,880,982 B2 | 2/2011 | Otsuki et al. | |
| 7,916,412 B2 | 3/2011 | Li et al. | |
| 8,116,012 B2 | 2/2012 | Higuchi | |
| 8,295,695 B2 | 10/2012 | Yoshida et al. | |
| 8,520,122 B2 | 8/2013 | Shiraki et al. | |
| 8,582,222 B2 | 11/2013 | Huang et al. | |
| 9,063,275 B2 | 6/2015 | Park | |
| 9,362,811 B2 | 6/2016 | Wang | |
| 9,690,070 B2 | 6/2017 | Lee et al. | |
| 9,854,144 B2 | 12/2017 | Park et al. | |
| 9,933,589 B2 | 4/2018 | Lo et al. | |
| 9,958,634 B2 | 5/2018 | Lee et al. | |
| 10,057,474 B2 | 8/2018 | Minamisawa et al. | |
| 10,101,595 B2 | 10/2018 | Hu et al. | |
| 10,185,115 B2 | 1/2019 | Wang et al. | |
| 10,197,762 B2 | 2/2019 | Park et al. | |
| 10,295,781 B2 | 5/2019 | Park et al. | |
| 10,401,591 B2 | 9/2019 | Tseng et al. | |
| 10,409,028 B2 | 9/2019 | Hu et al. | |
| 10,551,589 B2 | 2/2020 | Honma et al. | |
| 10,718,924 B2 | 7/2020 | Chou | |
| 10,746,955 B2 | 8/2020 | Park et al. | |
| 2018/0024307 A1 | 1/2018 | Lo et al. | |
| 2018/0106983 A1* | 4/2018 | Tsai | G02B 7/021 |
| 2018/0196218 A1 | 7/2018 | Kao et al. | |
| 2018/0372988 A1 | 12/2018 | Hu et al. | |
| 2019/0011663 A1 | 1/2019 | Weng et al. | |
| 2019/0394399 A1* | 12/2019 | Abe | H04N 5/23287 |
| 2020/0018925 A1 | 1/2020 | Chou et al. | |
| 2020/0110243 A1 | 4/2020 | Lee | |

FOREIGN PATENT DOCUMENTS

| | | |
|---|---|---|
| CN | 207424347 U | 5/2018 |
| TW | M509915 U | 10/2015 |
| TW | 201631348 A | 9/2016 |
| TW | 201901273 A | 1/2019 |
| TW | I650586 B | 2/2019 |
| WO | 2017022995 A1 | 2/2017 |
| WO | 2018216955 A1 | 11/2018 |

* cited by examiner

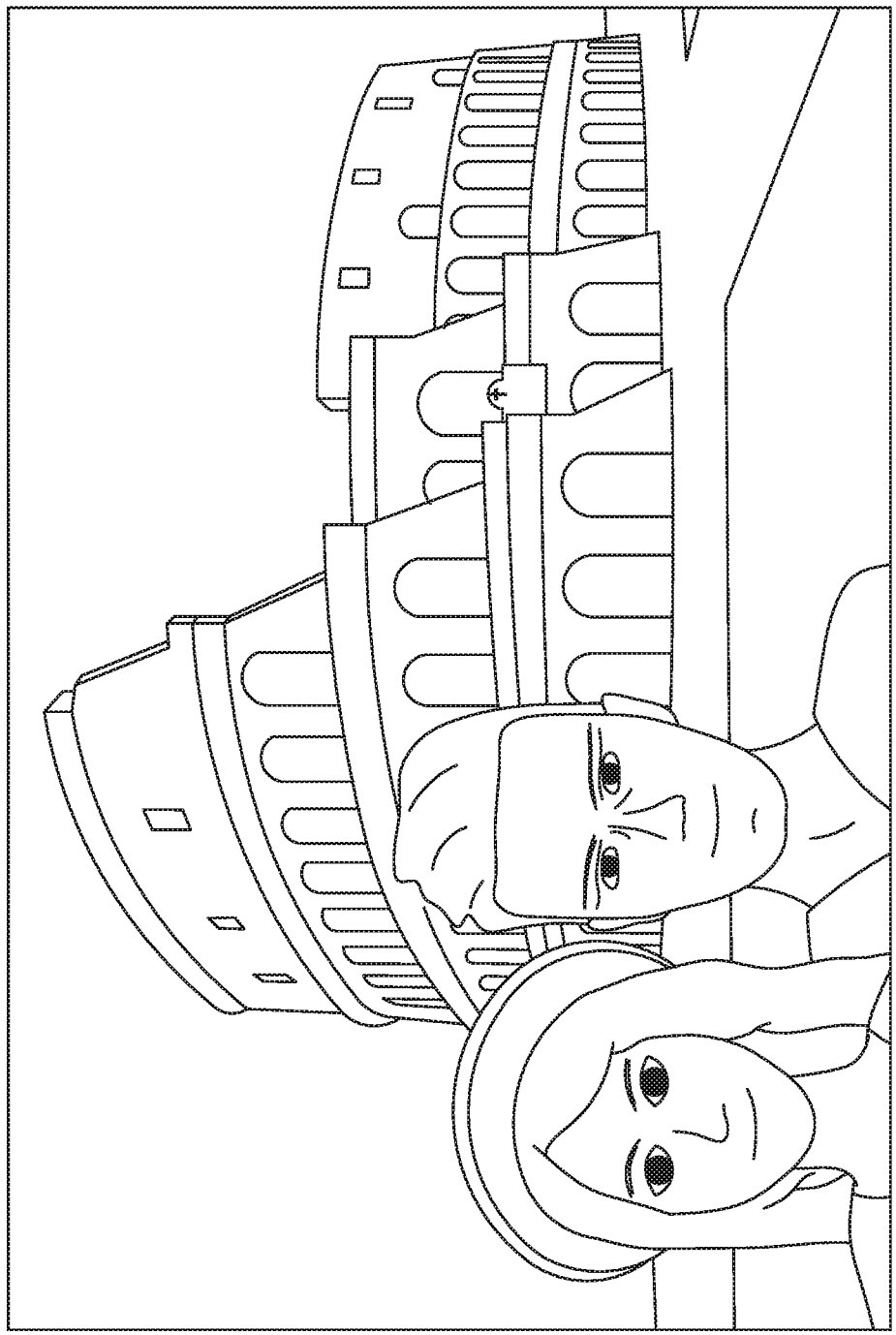

LENS ASSEMBLY MODULE WITH AUTOFOCUS FUNCTION AND ELECTRONIC DEVICE

RELATED APPLICATIONS

This application claims priority to Provisional Application Ser. No. 62/902,424, filed Sep. 19, 2019, which is herein incorporated by reference.

BACKGROUND

Technical Field

The present disclosure relates to a lens assembly module. More particularly, the present disclosure relates to a lens assembly module with lens driving function applied to portable electronic devices.

Description of Related Art

In recent years, the portable electronic devices have been developed rapidly, such as smart devices, tablets and so on. These portable electronic devices have been full of daily lives of modern people, and the lens assembly module mounted on the portable electronic devices has also flourished. The quality requirements for lens assembly module are also enhanced. Therefore, not only the quality of the optical design of the lens assembly module needs to be improved, but also the precision of manufacturing and assembling thereof also needs to be enhanced.

SUMMARY

According to one aspect of the present disclosure, a lens assembly module includes a base, a cover, a lens unit, an elastic element, at least two conductive elements, at least one AF coil element and at least two first magnetic elements. The base has a central opening. The cover is coupled to the base and has a through hole corresponding to the central opening of the base. The lens unit is movably disposed in the cover. The elastic element includes at least two elastic sheets, and each of the elastic sheets includes an inner portion, an outer portion and an elastic connecting portion. The inner portion is coupled to the lens unit and has an extending structure. The extending structure extends from the inner portion to a direction away from the lens unit. The outer portion is farther from the lens unit than the inner portion is therefrom. The elastic connecting portion is connected to the inner portion and the outer portion. The conductive elements are coupled to the lens unit. The AF coil element is disposed on the lens unit, wherein one end of the AF coil element is electrically connected to one of the conductive elements, and the other end of the AF coil element is electrically connected to the other one of the conductive elements. The first magnetic elements are disposed in the cover, face towards the AF coil element and disposed correspondingly to each other along an optical axis of the lens unit. A part of each of the extending structures is overlapped along a direction parallel to the optical axis and electrically connected to each of the conductive elements. The AF coil element and the conductive elements are electrically connected by a welding method.

According to another aspect of the present disclosure, an electronic device includes the lens assembly module according to the aforementioned aspect.

BRIEF DESCRIPTION OF THE DRAWINGS

The present disclosure can be more fully understood by reading the following detailed description of the embodiment, with reference made to the accompanying drawings as follows:

FIG. 1I is a schematic view of parameters $\psi A$, $\psi E$, $\psi CCM1$ and $\psi CCM2$ of the 1st embodiment in FIG. 1A.

FIG. 3D is a schematic view of the shooting image of the 3rd embodiment in FIG. 3A.

DETAILED DESCRIPTION

Figure 1A:
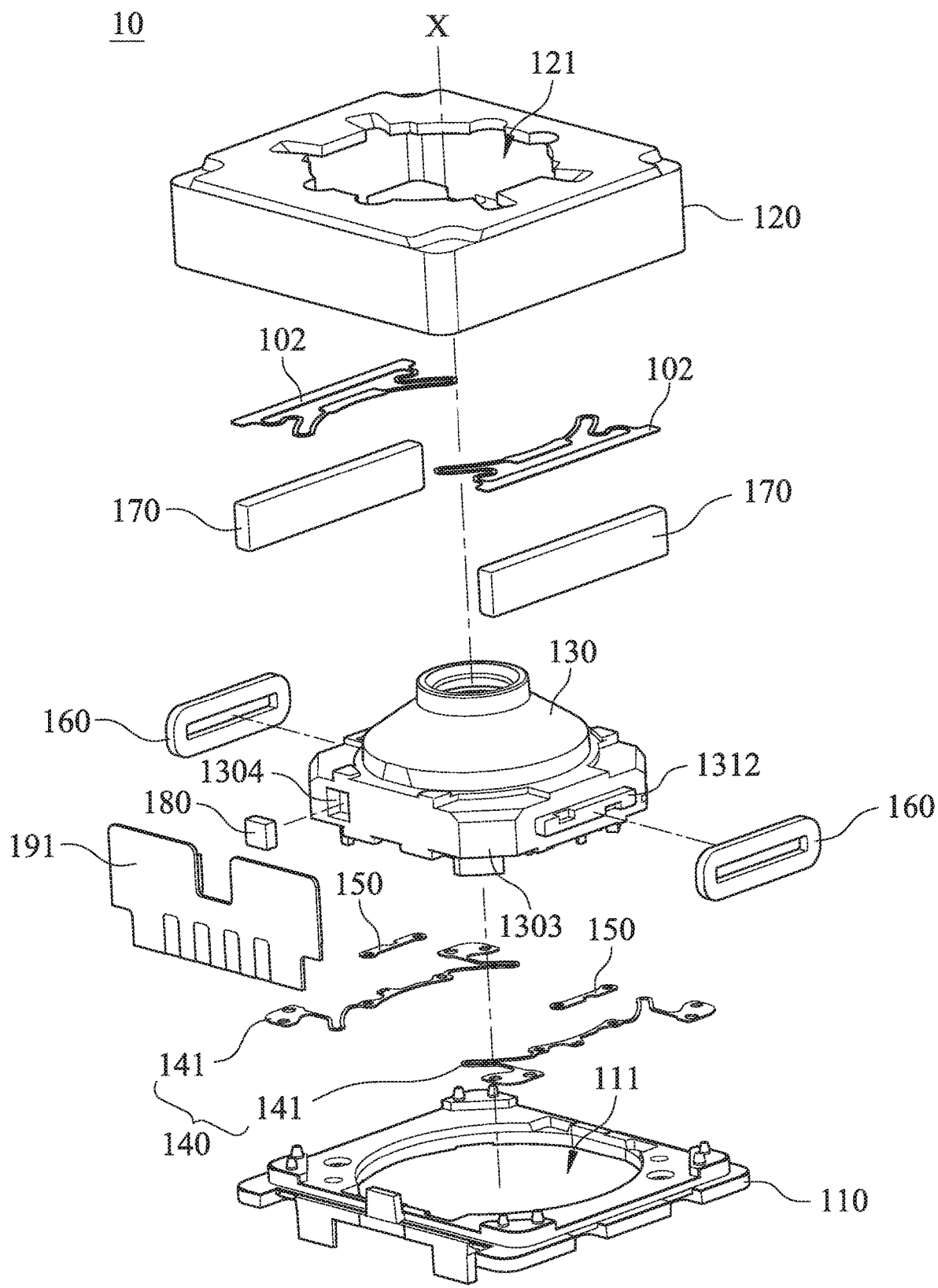
FIG. 1A is an exploded view of a lens assembly module according to the 1st embodiment of the present disclosure.

In one embodiment of the present disclosure, a lens assembly module includes a base, a cover, a lens unit, an elastic element, at least two conductive elements, at least one AF coil element and at least two first magnetic elements. The base has a central opening. The cover is coupled to the base and has a through hole corresponding to the central opening of the base. The lens unit is movably disposed in the cover. The elastic element includes at least two elastic sheets, and each of the elastic sheets includes an inner portion, an outer portion and an elastic connecting portion. The inner portion is coupled to the lens unit and has an extending structure, and the extending structure extends from the inner portion to a direction away from the lens unit. The outer portion is farther from the lens unit than the inner portion is therefrom. The elastic connecting portion is connected to the inner portion and the outer portion. The conductive elements are coupled to the lens unit. The AF coil element is disposed on the lens unit, wherein one end of the AF coil element is electrically connected to one of the conductive elements, and the other end of the AF coil element is electrically connected to the other one of the conductive elements. The first magnetic elements are disposed in the cover, face towards the AF coil element and disposed correspondingly to each other along an optical axis of the lens unit. A part of each of the extending structures is overlapped along a direction parallel to the optical axis and electrically connected to each of the conductive elements. The AF coil element and the conductive elements are electrically connected by a welding method. Therefore, the AF coil element and the conductive elements are electrically connected by the welding method which is not easy to affect the lens unit and can also avoid that the resolution of the lens unit is damaged by the partial high temperature and heat of the welding method. Further, the assembling efficiency of the elements in the lens assembly module can be improved by the aforementioned welding method, so that the irreversible damage to the lens unit during the respective stages of the manufacturing processes will not be left, and the manufacturing yield of the lens assembly module can be enhanced.

Each of the conductive elements is farther from the optical axis of the lens unit than the inner portion of each of the elastic sheets is therefrom. Therefore, it can avoid that other elements being welded are affected by the partial high temperature of the welding method, and other welding processes can be added according to the needs of the process, so that the stability of the manufacturing quality can be maintained under the premise of a compact lens assembly module.

The lens assembly module can further include a second magnetic element. The second magnetic element is coupled to the lens unit and does not overlap with the AF coil element along a direction perpendicular to the optical axis. Further, the lens assembly module can include a magnetic field sensing element. The magnetic field sensing element faces towards the second magnetic element, wherein the magnetic field sensing element is for detecting a position difference of the lens unit moving along the optical axis. Therefore, the magnetic fields of the AF coil element and the second magnetic element will not affect each other, and the sensitivity of the magnetic field sensing element detecting to the second magnetic element can be enhanced. In the lens assembly module according to the present disclosure, the magnetic field sensing element can be a Hall element or elements for detecting changes of magnetic field by the magnetic field characteristics thereof, but the present disclosure will not be limited thereto.

Each of the conductive elements is flat-sheet shape and has at least two bonding holes coupled to the lens unit. Therefore, the assembling efficiency of the conductive elements can be improved, and the strength of coupling can be enhanced.

A side of the lens unit facing towards the base can be a polygon. Therefore, the arrangement suitable for assembling the AF coil element can be provided which is favorable for increasing the volume utilization rate, so that the design requirement of the compact volume can be effectively maintained. Furthermore, the polygon can be a rectangle with four chamfered corners. The mold design margin for injection molding can be enhanced by the details of the rectangle, so as to match the better mold environmental conditions, and the efficiency of production can be improved.

Each of the outer portions is disposed adjacent to at least one of the chamfered corners, and each of the outer portions does not overlap with the lens unit along the direction parallel to the optical axis. Therefore, the volume of the lens assembly module can be utilized effectively, and the flatness of the elastic element before or after installed can be still maintained under the premise of volume reduction, and the permanent distortion of the elastic element after assembled can be reduced.

The lens assembly module can further include at least two gate traces disposed on at least two of the four chamfered corners, respectively. With aforementioned geometric design, the better mold removal position for the flow direction of the plastic of the injection molding can be strived, and it is favorable for maintaining the dimensional accuracy of the lens unit. Further, the number of the gate traces can be three.

A number of the at least one AF coil element can be at least two. The AF coil elements are disposed correspondingly to each other along the optical axis of the lens unit and are disposed on two opposite sides of the rectangle. Therefore, the volume of the lens assembly module can be effectively utilized, so as to avoid excessive volume to be occupied by the AF coil elements. The feasibility of the focus feedback control of the lens assembly module can be enhanced and the same volume thereof can be also maintained.

The elastic sheets are closer to the base than the conductive elements are thereto. Therefore, the assembling subsequence of the elastic elements can be later than the conductive elements thereof, so that the assembly quality of the AF coil element can be verified before the subsequent process, and the defective products can be picked out earlier to avoid wasting resources in the subsequent process.

The lens unit can include a coil holding member and a plurality of lens elements. The coil holding member defines an interior space, and the AF coil element is disposed on an outer surface of the coil holding member. The lens elements are disposed in the interior space. Therefore, the lens unit is assembled with the AF coil element and the lens elements at the same time, which saves more space than the traditional lens barrel must be assembled with the lens carrier, and the problem of skew after unnecessary assembling can be improved. The number of the elements can be substantially reduced, so as to reduce the mold design, usage and the manufacturing cost.

When a diameter of a maximum optical effective area of the lens unit facing towards an image side is $\psi A$, and a minimum diameter of the inner portion of each of the elastic sheets is $\psi E$, the following condition can be satisfied: $0.6<(\psi A)/(\psi E)\leq 1.0$. Therefore, the compact lens assembly module can be maintained, and the unnecessary volume of elements for avoiding the impact of partial high heat due to the welding method will not be forced to increase. Further, the following condition can be satisfied: $0.73<(\psi A)/(\psi E)\leq 1.0$. Therefore, the design optimization can be achieved by the proper space configuration of the elastic element and the conductive elements.

The AF coil element can overlap with each of the conductive elements along the direction parallel to the optical axis. Therefore, the image recognition clarity of the welding process can be simplified, so that the position welded between the AF coil element and the conductive elements can be easily located in the automatic process, and the working efficiency can be enhanced.

When the diameter of the maximum optical effective area of the lens unit facing towards the image side is $\psi A$, the minimum diameter of the inner portion of each of the elastic sheets is $\psi E$, and a maximum diameter of an overlapping portion of the AF coil element and each of the conductive elements along the direction parallel the optical axis is $\psi CCM$, the following condition can be satisfied: $0.4<(\psi CCM-\psi E)/(\psi E-\psi A)<1.7$. Therefore, the small volume space configuration can be maintained, the impact of the welding process of the lens assembly module can be reduced, the durability of the lens unit can be enhanced, and the stability of the lens assembly module can be improved. Further, a welding tin flows through a portion that the AF coil element and the conductive elements overlap in the direction parallel to the optical axis.

Each of the conductive elements is flat-sheet shape and is electrically connected to each of the extending structures by the welding method. Therefore, it is favorable for manufacturing and assembling the lens assembly module, and the process requirements for welding or additional mounting holes of subsequent processes can be easy to coordinate. The cost of assembling equipment and the cost of developing the automated equipment can be also reduced effectively.

Each of the aforementioned features of the lens assembly module can be utilized in various combinations for achieving the corresponding effects In another embodiment of the present disclosure, an electronic device includes the aforementioned lens assembly module. Therefore, an electronic device with imaging quality and assembly stability can be provided.

According to the above description of the present disclosure, the following specific embodiments are provided for further explanation.

1st Embodiment

Figure 1B:
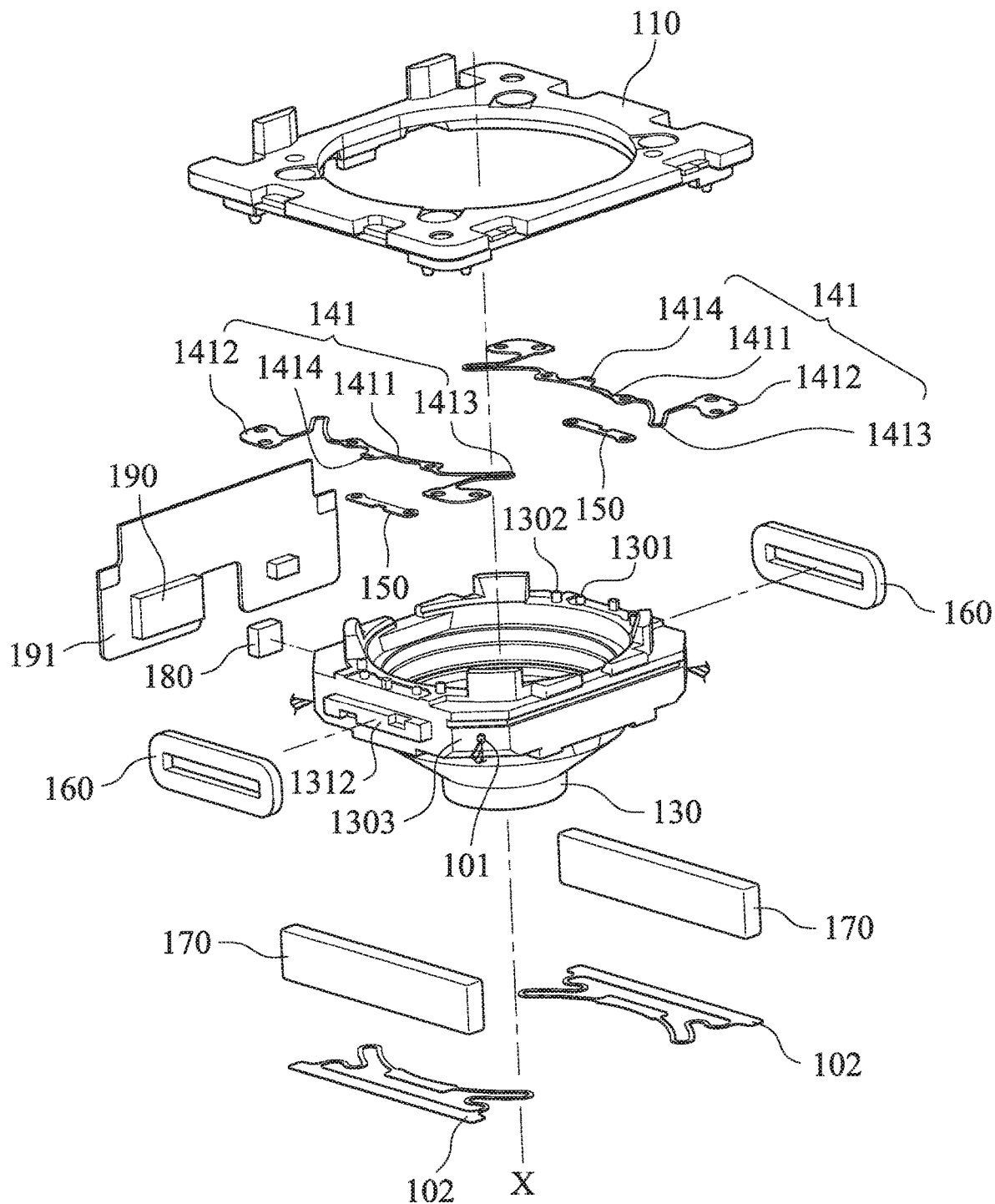
FIG. 1B is another exploded view of the lens assembly module of the 1st embodiment in FIG. 1A.
Figure 1C:
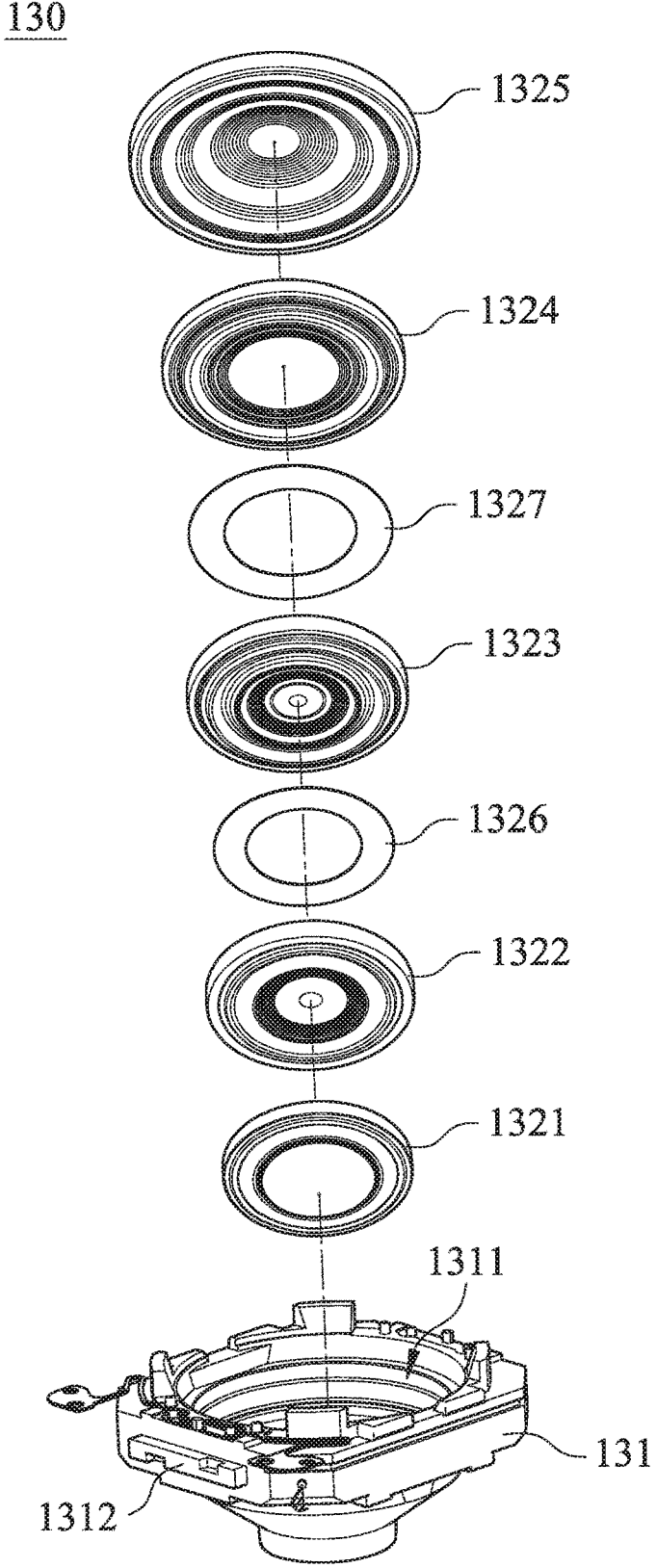
FIG. 1C is a schematic view of the lens unit of the 1st embodiment in FIG. 1A.

FIG. 1A is an exploded view of a lens assembly module 10 according to the 1st embodiment of the present disclosure. FIG. 1B is another exploded view of the lens assembly module 10 of the 1st embodiment in FIG. 1A. As shown in FIGS. 1A and 1B, the lens assembly module 10 includes a base 110, a cover 120, a lens unit 130, an elastic element 140, at least two conductive elements 150, at least one AF coil element 160 and at least two first magnetic elements 170.

The base 110 has a central opening 111. The cover 120 is coupled to the base 110 and has a through hole 121. The through hole 121 corresponds to the central opening 111 of the base 110. The lens unit 130 is movably disposed in the cover 120. The elastic element 140 includes two elastic sheets 141 coupled to the lens unit 130, respectively. The conductive elements 150 are coupled to the lens unit 130, respectively. The AF coil elements 160 are disposed on the lens unit 130, wherein one end of each of the AF coil elements 160 is electrically connected to one of the conductive elements 150, and the other end of each of the AF coil elements 160 is electrically connected to the other one of the conductive elements 150. The first magnetic elements 170 are disposed in the cover 120, face towards the AF coil elements 160 and disposed correspondingly to each other along an optical axis X of the lens unit 130. Therefore, with the aforementioned arrangement, the autofocus function can be provided by the lens assembly module 10.

FIG. 1O is a schematic view of the lens unit 130 of the 1st embodiment in FIG. 1A. The lens unit 130 includes a coil holding member 131 and a plurality of lens elements 1321, 1322, 1323, 1324 and 1325. The coil holding member 131 defines an interior space 1311, and the AF coil elements 160 are disposed on an outer surface (its reference numeral is omitted) of the coil holding member 131. Specifically, the coil holding member 131 includes a coil holding protrusion 1312 for connecting the AF coil elements 160. The lens elements 1321, 1322, 1323, 1324 and 1325 are disposed in the interior space 1311. In detail, in the 1st embodiment, a number of the lens elements 1321, 1322, 1323, 1324, 1325 is five, but the present disclosure will not be limited thereto. Further, the lens unit 130 can further include optical elements 1326, 1327 which are light blocking sheet and are disposed between the lens elements 1322, 1323 and between the lens elements 1323, 1324, respectively. It is favorable for improving the assembling yield and imaging quality of the lens assembly module 10, but it should be mentioned that the position of the optical elements will not be limited thereto, and other elements such as spacer ring or fixed ring can be configured according to requirements.

Figure 1D:
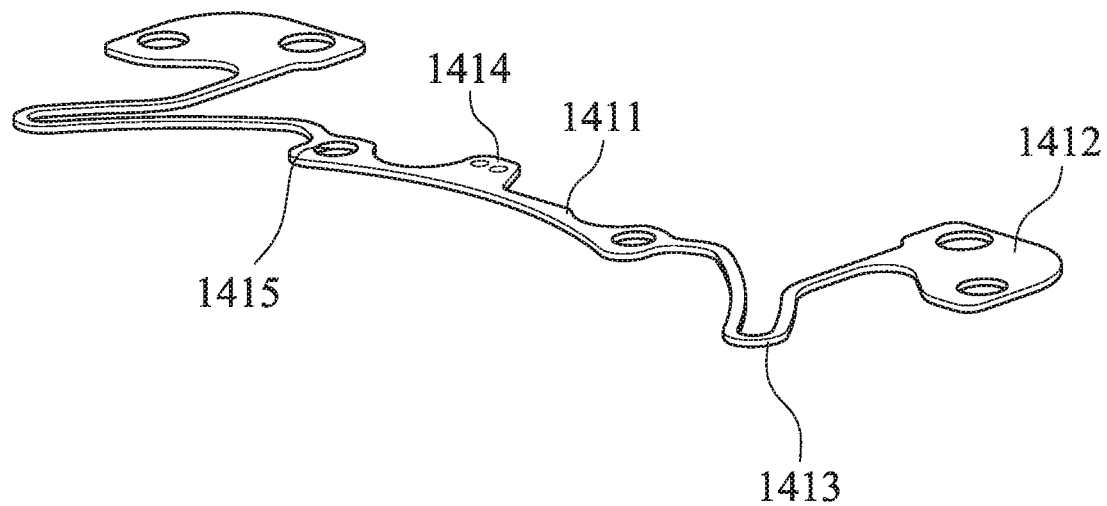
FIG. 1D is a schematic view of the elastic sheet of the 1st embodiment in FIG. 1A.

FIG. 1D is a schematic view of the elastic sheet 141 of the 1st embodiment in FIG. 1A. As shown in FIGS. 1B and 1D, each of the elastic sheets 141 includes an inner portion 1411, an outer portion 1412 and an elastic connecting portion 1413. The inner portion 1411 is coupled to the lens unit 130 and has an extending structure 1414. The extending structure 1414 extends from the inner portion 1411 to a direction away from the lens unit 130. The outer portion 1412 is farther from the lens unit 130 than the inner portion 1411 is therefrom. The elastic connecting portion 1413 is connected to the inner portion 1411 and the outer portion 1412.

Figure 1E:
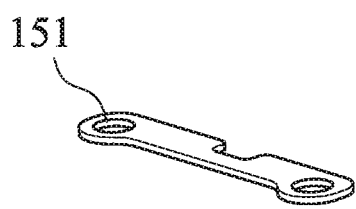
FIG. 1E is a schematic view of the conductive element of the 1st embodiment in FIG. 1A.

FIG. 1E is a schematic view of the conductive element 150 of the 1st embodiment in FIG. 1A. As shown in FIGS. 1B and 1E, each of the conductive elements 150 can be flat-sheet shape and has at least two bonding holes 151. The bonding holes 151 are coupled to the lens unit 130.

Figure 1F:
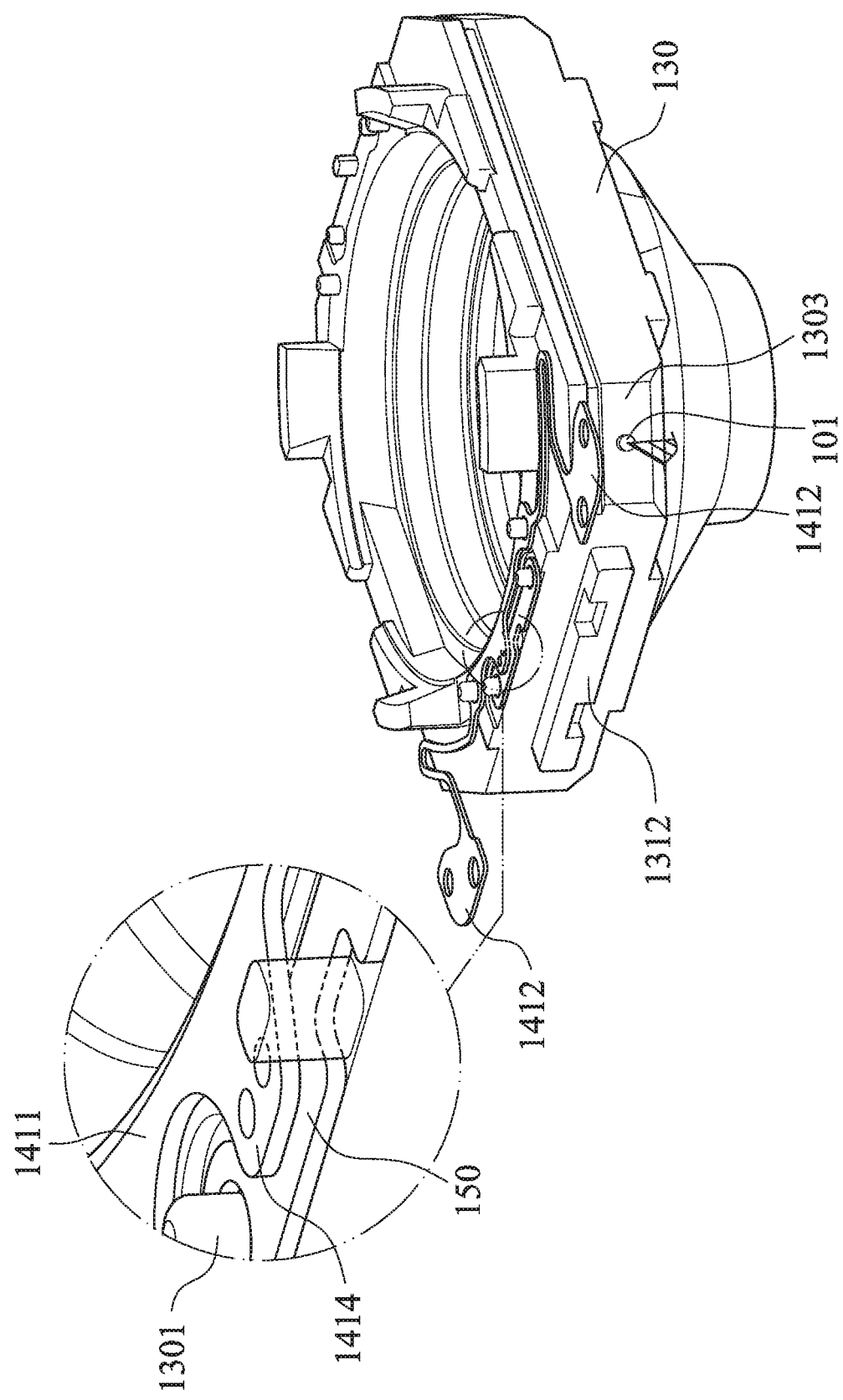
FIG. 1F is a schematic view of the lens unit, the elastic sheet and the conductive element of the 1st embodiment in FIG. 1A.

FIG. 1F is a schematic view of the lens unit 130, the elastic sheet 141 and the conductive element 150 of the 1st embodiment in FIG. 1A. As shown in FIGS. 1B, 1D, 1E and 1F, the bonding holes 151 of each of the conductive elements 150 are coupled to a fixed protrusion 1301 of the lens unit 130 protruding towards the base 110. The inner portion 1411 of each of the elastic sheets 141 has two positioning holes 1415, and the positioning holes 1415 are coupled to positioning protrusions 1302 protruding toward the base 110. The conductive elements 150 are farther from the optical axis X of the lens unit 130 than the inner portions 1411 of each of the elastic sheets 141 is therefrom. The elastic sheets 141 are closer to the base 110 than the conductive elements 150 are thereto. In detail, after the conductive elements 150 are coupled to the lens unit 130, the elastic sheets 141 are coupled to the lens unit 130, and then the conductive elements 150 are electrically connected to the inner portions 1411 of the elastic sheets 141 by the welding method.

Figure 1G:
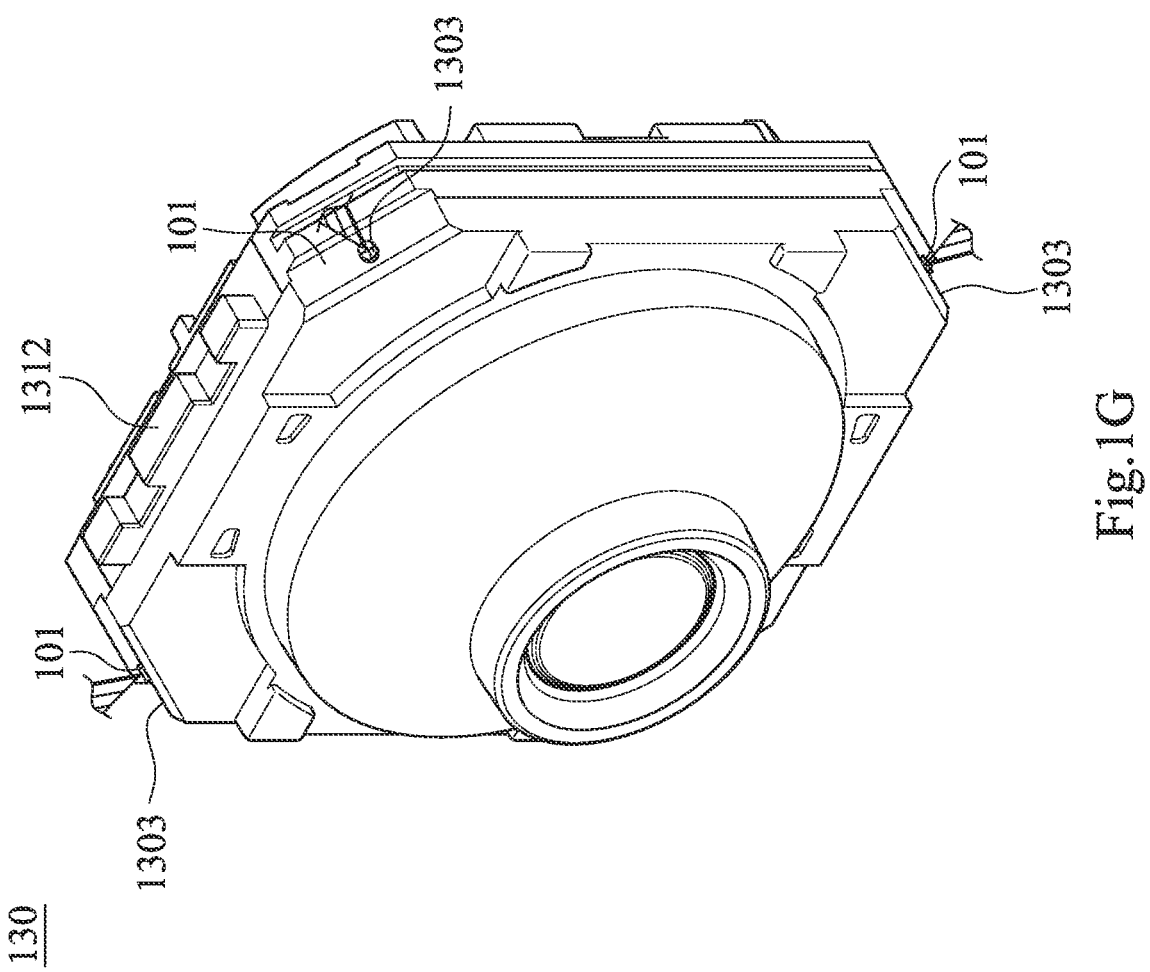
FIG. 1G is a three-dimensional view of the lens unit of the 1st embodiment in FIG. 1A.
Figure 1H:
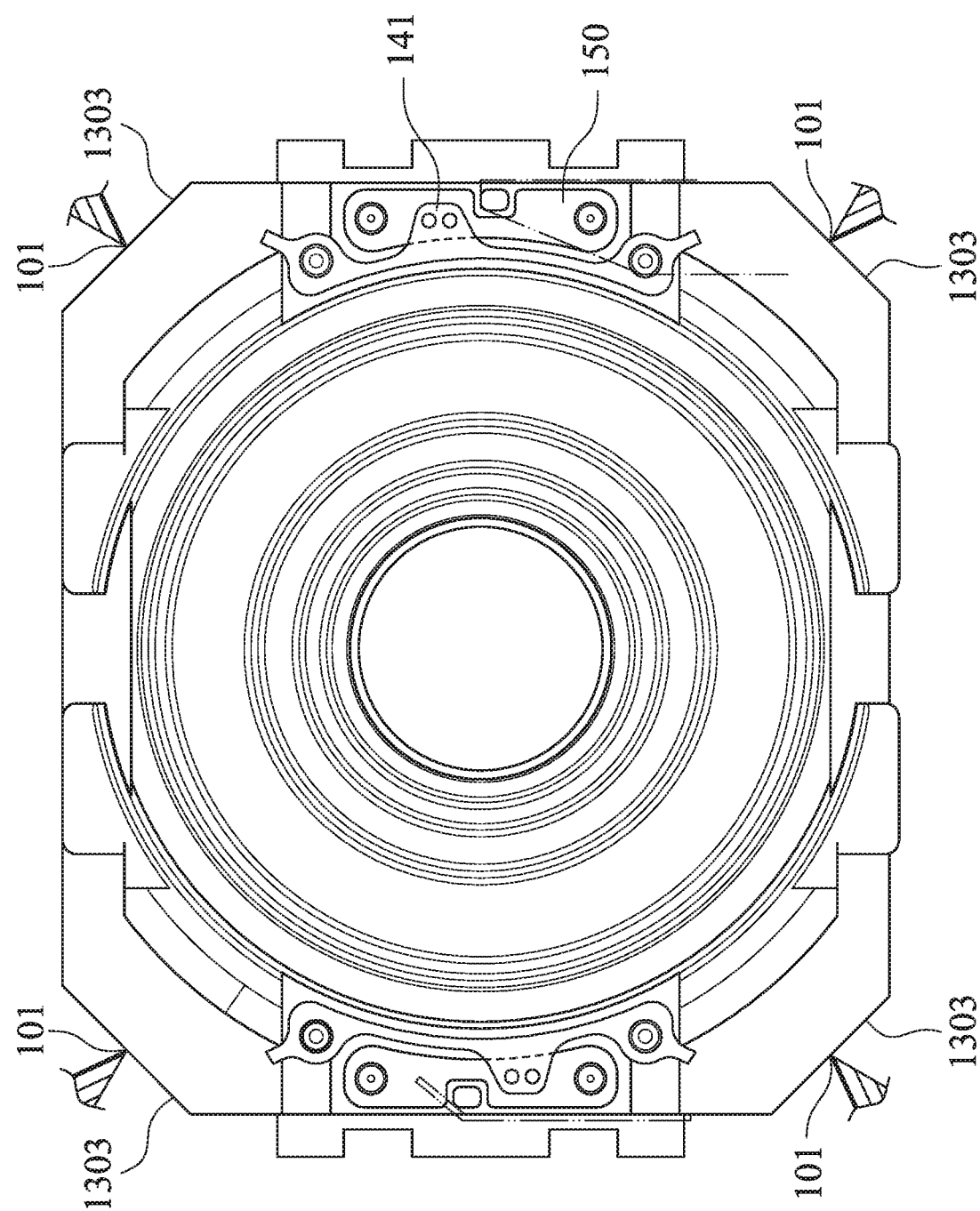
FIG. 1H is a plane view of the lens unit of the 1st embodiment in FIG. 1A.
Figure 11:
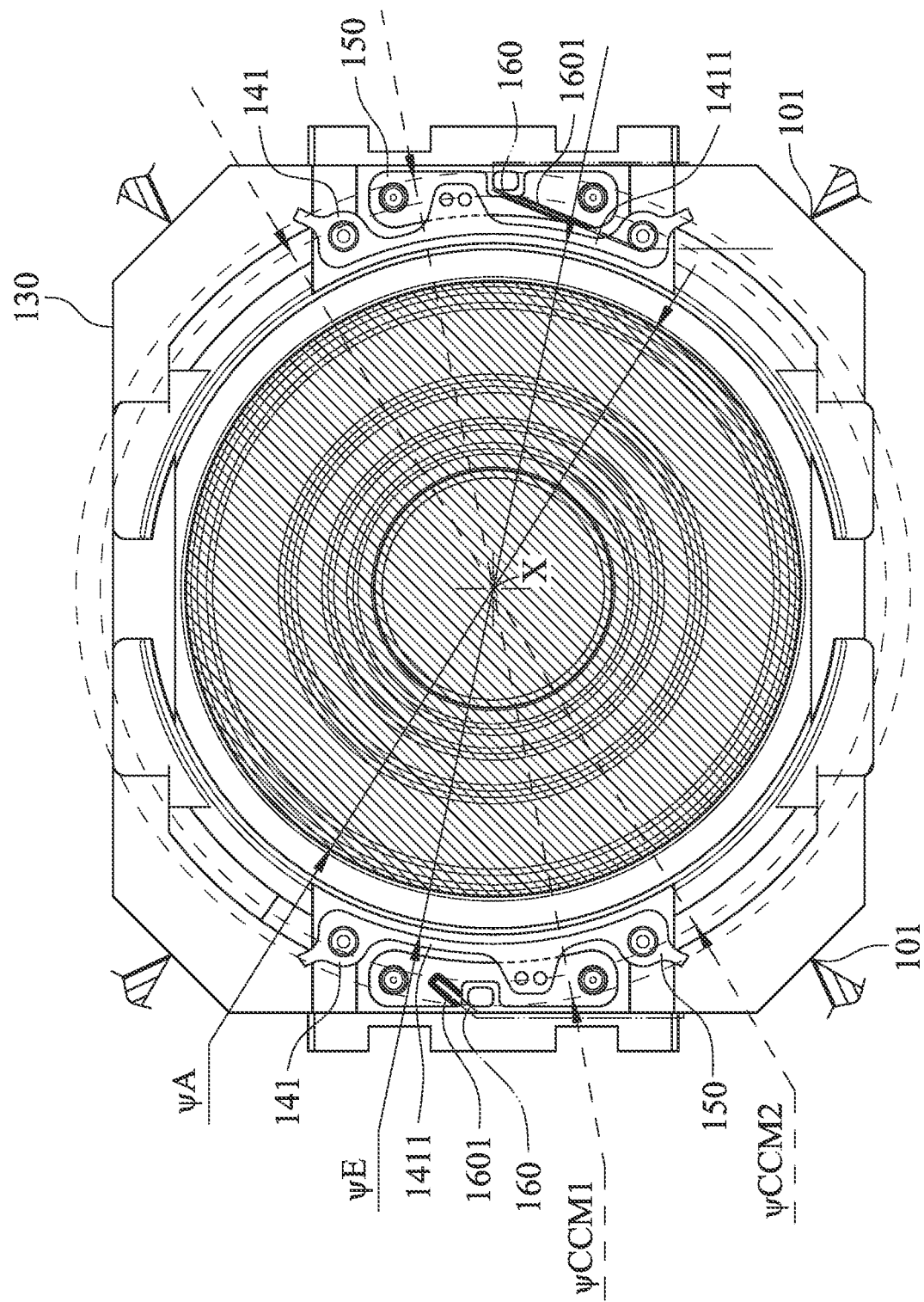

FIG. 1G is a three-dimensional view of the lens unit 130 of the 1st embodiment in FIG. 1A. FIG. 1H is a plane view of the lens unit 130 of the 1st embodiment in FIG. 1A. As shown in FIGS. 1B, 1G and 1H, a side of the lens unit 130 facing towards the base 110 is a polygon. Specifically, in the 1st embodiment, the polygon is a rectangle, but the present disclosure will not be limited thereto. The polygon has four chamfered corners 1303. The outer portion 1412 of each of the elastic sheets 141 is disposed adjacent to at least one of the chamfered corners 1303, and each outer portion 1412 does not overlap with the lens unit 130 along the direction parallel to the optical axis X.

Further, the lens assembly module 10 can further include at least two gate traces 101. The gate traces 101 are disposed on at least two of the chamfered corners 1303, respectively. Specifically, in the 1st embodiment, the number of the gate traces 101 is four and the gate traces 101 are disposed on the four chamfered corners 1303, respectively. It should be mentioned that, the number of the chamfered corners and the gate traces of present disclosure will not be limited thereto.

In the 1st embodiment, the number of the AF coil elements 160 is at least two. The AF coil elements 160 are disposed correspondingly to each other along the optical axis X of the lens unit 130 and are disposed on two opposite sides of the rectangle. Further, the AF coil elements 160 overlap with each of the conductive elements 150 along the direction parallel to the optical axis X. A welding tin 1601 (shown in FIG. 1I) flows through a portion that the AF coil elements 160 and the conductive elements 150 overlap in the direction parallel to the optical axis X.

Further, please refer to FIGS. 1A and 1B, the lens assembly module 10 can further include a second magnetic element 180 coupled to the lens unit 130, wherein the second magnetic element 180 does not overlap with the AF coil elements 160 along the direction perpendicular to the optical axis X. Specifically, the second magnetic element 180 is disposed on one of the other two sides of the rectangle and does not affect with the AF coil elements 160. In order to position the second magnetic element 180 stably, the lens unit 130 can further include a positioning notch 1304 for disposing the second magnetic element 180 therein. Further, the lens assembly module 10 can further include a magnetic field sensing element 190 facing towards the second magnetic element 180, wherein the magnetic field sensing element 190 is for detecting a position difference of the lens unit 130 moving along the optical axis X. In addition, the magnetic field sensing element 190 can be positioned on a lining board 191 and the lining board 191 is positioned on an inner wall of the cover 120. In the 1st embodiment, the magnetic field sensing element 190 can be a Hall element, but the present disclosure will not be limited thereto.

Further, the lens assembly module 10 can further include two elastic units 102 disposed between the lens unit 130 and the cover 120, which are favorable for improving the smoothness of the lens unit 130 when driven and replaced.

FIG. 1I is a schematic view of parameters $\psi A$, $\psi E$, $\psi CCM1$ and $\psi CCM2$ of the 1st embodiment in FIG. 1A. As shown in FIG. 1I, when a diameter of a maximum optical effective area of the lens unit 130 facing towards an image side is $\psi A$, a minimum diameter of the inner portion 1411 of each of the elastic sheets 141 is $\psi E$, and maximum diameters of an overlapping portion of the AF coil elements 160 and each of the conductive elements 150 along the direction parallel the optical axis X are $\psi CCM1$ and $\psi CCM2$, respectively. The parameter values and the condition values of the 1st embodiment are as the follows: $\psi A=4.9258$ mm, $\psi E=5.7$ mm, $(\psi A)/(\psi E)=0.864$, $\psi CCM1=6.6927$ mm, $\psi CCM2=6.3038$ mm, $(\psi CCM1-\psi E)/(\psi E-\psi A)=1.282$ and $(\psi CCM2-\psi E)/(\psi E-\psi A)=0.780$, but the present disclosure will not be disclosure thereto. It should be mentioned that, in the 1st embodiment, the number of the AF coil elements 160 and the conductive elements 150 are both two, therefore, the corresponding parameters are recorded and marked with $\psi CCM1$ and $\psi CCM2$, the definition thereof are the same as the parameter $\psi CCM$ described in this disclosure.

2nd Embodiment

Figure 2:
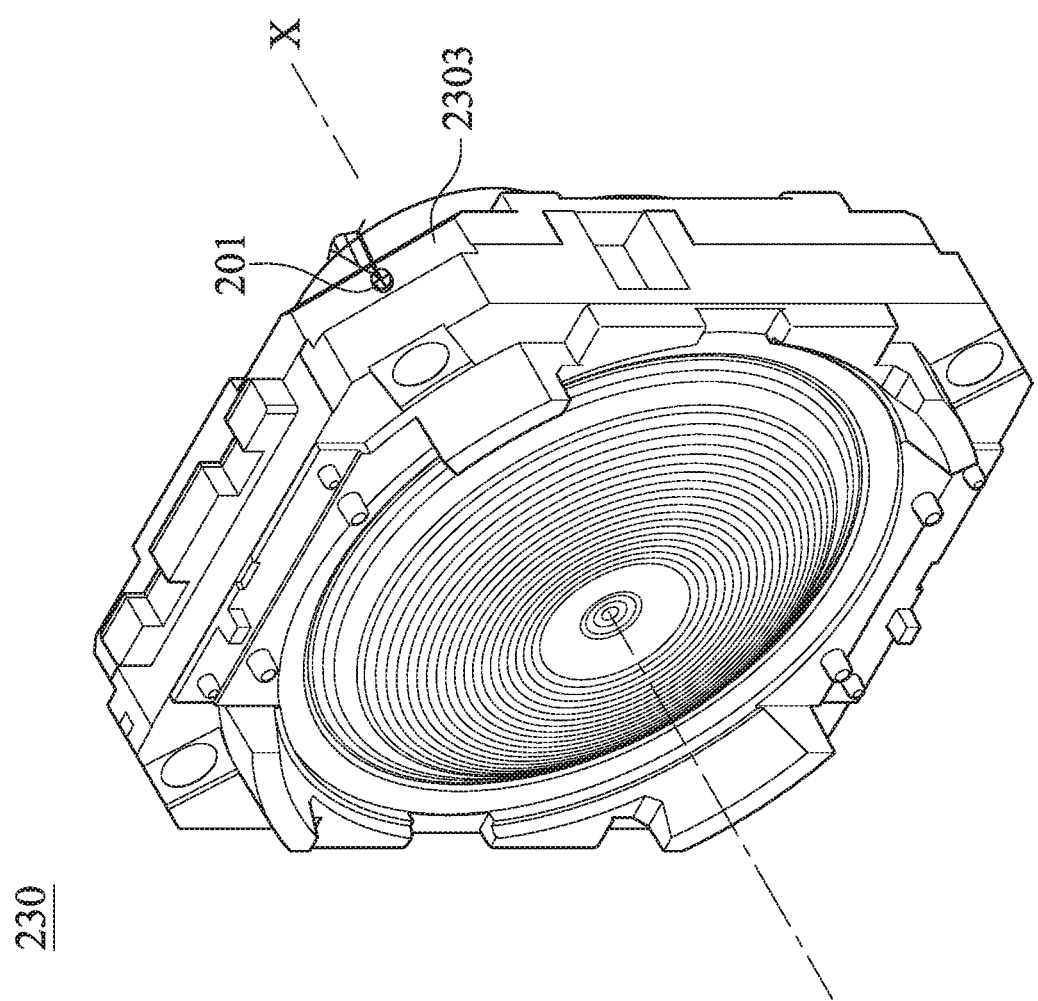
FIG. 2 is a three-dimensional view of a lens unit of a lens assembly module according to the 2nd embodiment of the present disclosure.

FIG. 2 is a three-dimensional view of a lens unit 230 of a lens assembly module according to the 2nd embodiment of the present disclosure. The structures and the component configurations of the 2nd embodiment of the present disclosure are the same as those of the 1st embodiment, and will not be described herein again. As shown in FIG. 2, in the 2nd embodiment, a side of the lens unit 230 facing towards the base (not shown) is a polygon. Specifically, in the 2nd embodiment, the polygon is a rectangle, but the present disclosure will not be limited thereto. The polygon has four chamfered corners 2303. Further, the lens assembly module can further include at least two gate traces 201. The gate traces 201 are disposed on at least two of the chamfered corners 2303, respectively. Specifically, in the 2nd embodiment, the number of the gate traces 201 is four. The gate traces 201 are disposed on four chamfered corners 2303, respectively, and each of the gate traces 201 has a sunken structure (its reference numeral is omitted) facing towards the optical axis X. Therefore, it can avoid affecting the smoothness of the lens assembly module.

3th Embodiment

Figure 3A:
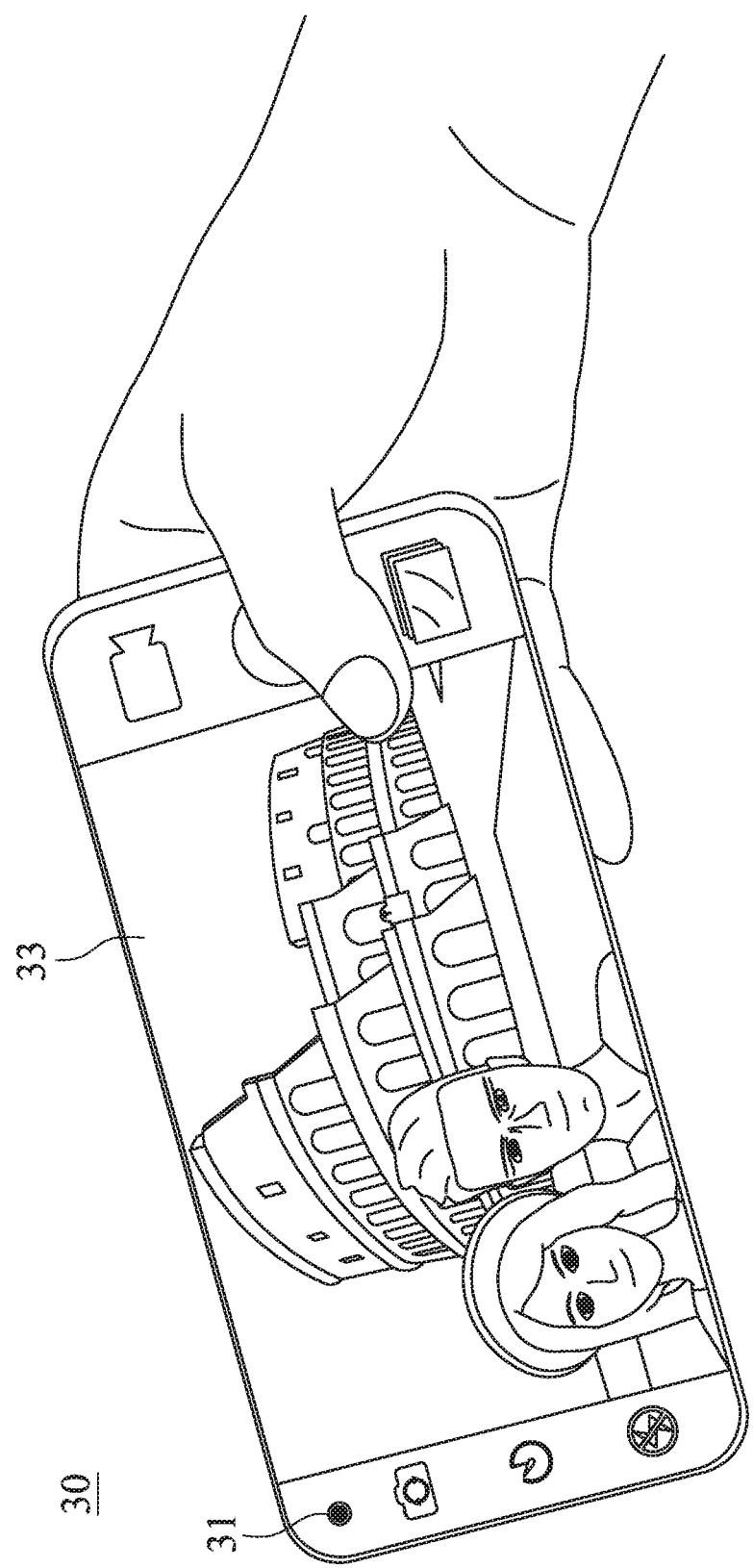
FIG. 3A is a schematic view of an electronic device according to the 3rd embodiment of the present disclosure.
Figure 3B:
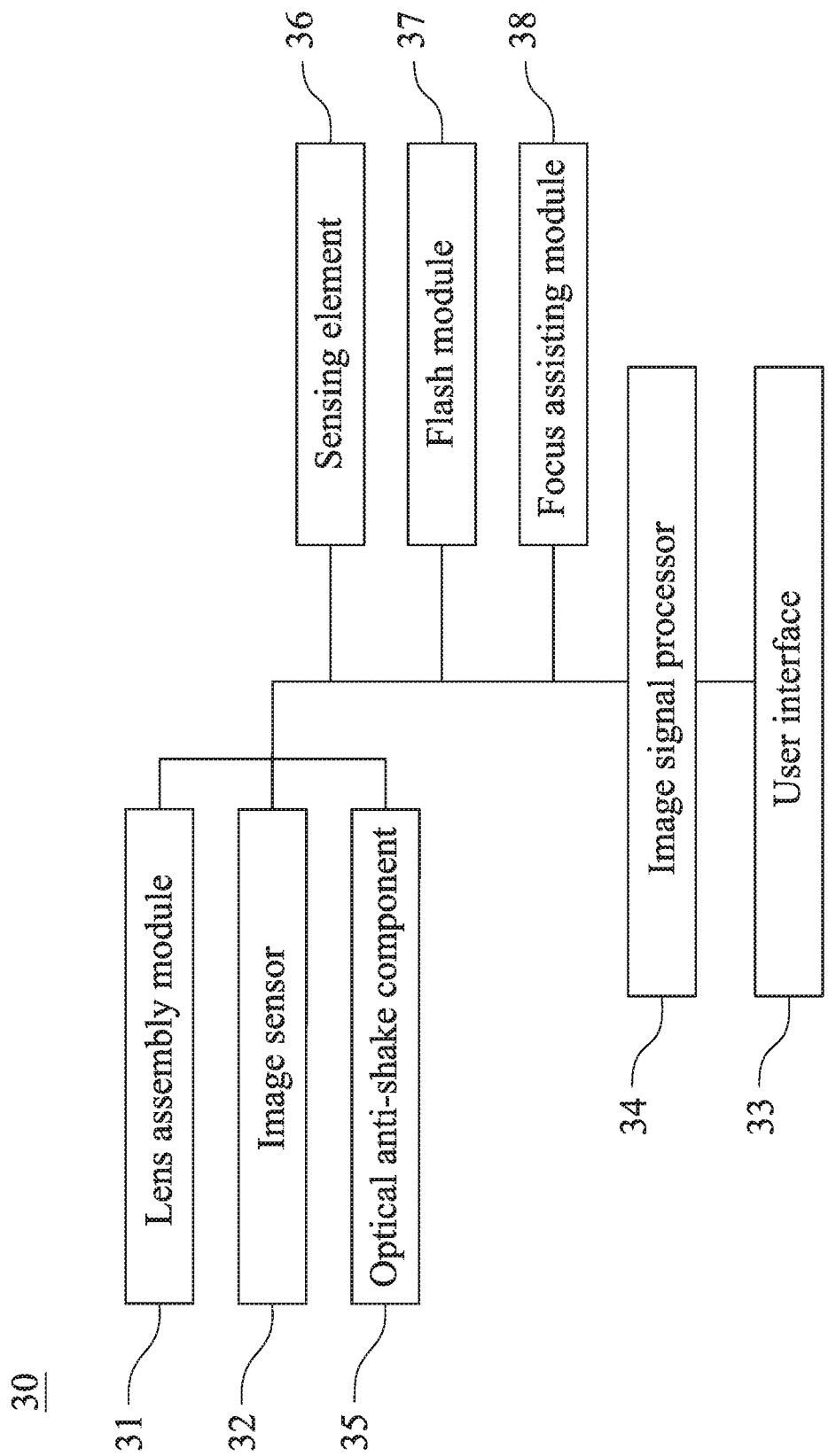
FIG. 3B is a block diagram of the electronic device of the 3rd embodiment in FIG. 3A.

FIG. 3A is a schematic view of an electronic device 30 according to the 3rd embodiment of the present disclosure. FIG. 3B is a block diagram of the electronic device 30 of the 3rd embodiment in FIG. 3A. The electronic device 30 is a smart phone and includes a lens assembly module 31, a user interface 33 and an image sensor 32. The lens assembly module 31 of the 3rd embodiment is disposed on a side of the user interface 33. The image sensor 32 is disposed on an imaging surface (not shown) of the lens assembly module 31, wherein the user interface 33 can be a touch screen or a display screen, but the present disclosure will not be limited thereto. The lens assembly module 31 can be any one of the aforementioned 1st and 2nd embodiments, but the present disclosure will not be limited thereto.

Further, a user activates a capturing mode via the user interface 33 of the electronic device 30. At this time, the lens assembly module 31 converges the imaging light on the image sensor 32 and outputs the electronic signals associated with the image to the image signal processor (ISP) 34.

The electronic device 30 can further include an optical anti-shake component 35, which can be an OIS anti-shake feedback device, in response to the camera specification of the electronic device 30. Moreover, the electronic device 30 can further include at least one auxiliary optical element (its reference numeral is omitted) and at least one sensing element 36. In the 3rd embodiment, the auxiliary optical elements can be a flash module 37 and a focus assisting module 38. The flash module 37 can be for compensating for color temperatures. The focus assisting module 38 can be infrared distance measurement component and laser focus module, etc. The sensing element 36 can be with functions for sensing physical momentum and kinetic energies, such as an accelerator, a gyroscope, and a Hall Effect element, to sense shaking or jitters applied by hands of the user or external environments. As a result, the auto focus function and the optical anti-shake component 35 disposed on the lens assembly module 31 of the electronic device 30 can function to obtain great imaging qualities and facilitate the electronic device 30 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

In addition, the electronic device 30 can further include, but not be limited to, a display, a control unit, a storage unit, a random access memory (RAM), a read-only memory (ROM), or the combination thereof.

Figure 3C:
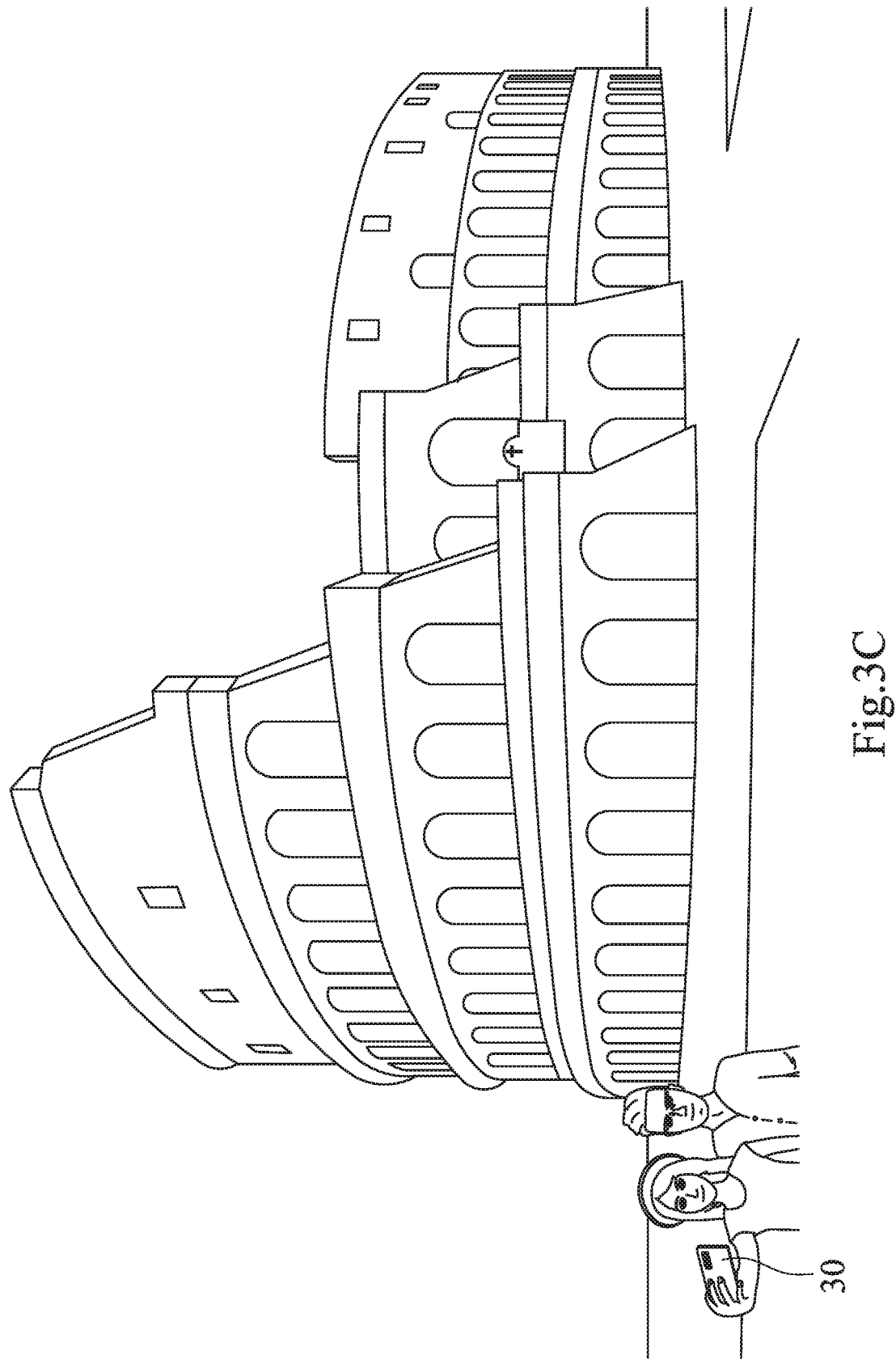
FIG. 3C is a schematic view of the selfie scene of the 3rd embodiment in FIG. 3A.

FIG. 3C is a schematic view of the selfie scene of the 3rd embodiment in FIG. 3A. FIG. 3D is a schematic view of the shooting image of the 3rd embodiment in FIG. 3A. As shown in FIGS. 3A to 3D, both of the lens assembly module 31 and the image sensor 32 face towards the user, when taking a selfie or living streaming, the user can simultaneously watch the captured image and perform the interface operation, and the image as shown in FIG. 3D can be obtained after shooting. Therefore, a better shooting experience can be provided by the lens assembly module 31 of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lens assembly module, comprising:
a base having a central opening;
a cover coupled to the base and having a through hole corresponding to the central opening of the base;
a lens unit movably disposed in the cover;
an elastic element comprising at least two elastic sheets, and each of the elastic sheets comprising:
an inner portion coupled to the lens unit and having an extending structure, and the extending structure extending from the inner portion to a direction away from the lens unit;
an outer portion farther from the lens unit than the inner portion therefrom; and
an elastic connecting portion connected to the inner portion and the outer portion;
at least two conductive elements coupled to the lens unit;
at least one AF coil element disposed on the lens unit, wherein one end of the at least one AF coil element is electrically connected to one of the at least two conductive elements, and the other end of the at least one AF coil element is electrically connected to the other one of the at least two conductive elements; and
at least two first magnetic elements disposed in the cover, facing towards the at least one AF coil element and disposed correspondingly to each other along an optical axis of the lens unit;
wherein a part of each of the extending structures is overlapped along a direction parallel to the optical axis and electrically connected to each of the conductive elements;
wherein the at least one AF coil element and the at least two conductive elements are electrically connected by a welding method;
wherein a side of the lens unit facing towards the base is a polygon, and the polygon is a rectangle with four chamfered corners;
wherein each of the outer portions is disposed adjacent to at least one of the chamfered corners and each of the outer portions does not overlap with the lens unit along the direction parallel to the optical axis.

2. The lens assembly module of claim 1, wherein each of the conductive elements is farther from the optical axis of the lens unit than the inner portion of each of the elastic sheets is therefrom.

3. The lens assembly module of claim 1, further comprising:
a second magnetic element coupled to the lens unit, wherein the second magnetic element does not overlap with the at least one AF coil element along a direction perpendicular to the optical axis.

4. The lens assembly module of claim 3, further comprising:
a magnetic field sensing element facing towards the second magnetic element, wherein the magnetic field sensing element is for detecting a position difference of the lens unit moving along the optical axis.

5. The lens assembly module of claim 2, wherein each of the conductive elements is flat-sheet shape and has at least two bonding holes coupled to the lens unit.

6. The lens assembly module of claim 1, further comprising:
at least two gate traces disposed on at least two of the chamfered corners, respectively.

7. The lens assembly module of claim 1, wherein a number of the at least one AF coil element is at least two, the at least two AF coil elements are disposed correspondingly to each other along the optical axis of the lens unit and are disposed on two opposite sides of the rectangle.

8. The lens assembly module of claim 2, wherein each of the elastic sheets is closer to the base than each of the conductive elements is thereto.

9. The lens assembly module of claim 1, wherein the lens unit comprises:
a coil holding member defining an interior space, and the at least one AF coil element disposed on an outer surface of the coil holding member; and
a plurality of lens elements disposed in the interior space.

10. The lens assembly module of claim 1, wherein a diameter of a maximum optical effective area of the lens unit facing towards an image side is $\psi A$, a minimum diameter of the inner portion of each of the elastic sheets is $\psi E$, and the following condition is satisfied:

$$0.6 < (\psi A)/(\psi E) \leq 1.0.$$

11. The lens assembly module of claim 10, wherein the diameter of the maximum optical effective area of the lens unit facing towards the image side is $\psi A$, the minimum diameter of the inner portion of each of the elastic sheets is $\psi E$, and the following condition is satisfied:

$$0.73 < (\psi A)/(\psi E) \leq 1.0.$$

12. The lens assembly module of claim 9, wherein the at least one AF coil element overlaps with at least one of the conductive elements along the direction parallel to the optical axis.

13. The lens assembly module of claim 12, wherein a diameter of a maximum optical effective area of the lens unit facing towards an image side is $\psi A$, a minimum diameter of the inner portion of each of the elastic sheets is $\psi E$, a maximum diameter of an overlapping portion of the at least one AF coil element and at least one of the conductive elements along the direction parallel the optical axis is $\psi CCM$, and the following condition is satisfied:

$$0.4 < (\psi CCM - \psi E)/(\psi E - \psi A) < 1.7.$$

14. The lens assembly module of claim 9, wherein each of the conductive elements is flat-sheet shape and electrically connected to each of the extending structures by the welding method.

15. An electronic device, comprising:
the lens assembly module of claim 8.

* * * * *